United States Patent [19]
Irie

[11] Patent Number: 6,082,706
[45] Date of Patent: Jul. 4, 2000

[54] NON-SLIDING VACUUM GATE VALVE

[75] Inventor: Norikimi Irie, Tokyo, Japan

[73] Assignee: Irie Koken Co., Ltd., Tokyo, Japan

[21] Appl. No.: 09/188,230

[22] Filed: Nov. 9, 1998

[51] Int. Cl.[7] .................................................. F16K 25/00
[52] U.S. Cl. .......................................... 251/158; 251/203
[58] Field of Search .................................. 251/193, 203, 251/204, 158

[56] References Cited

U.S. PATENT DOCUMENTS

| | | | |
|---|---|---|---|
| 4,470,576 | 9/1984 | Schertler | 251/193 |
| 4,753,417 | 6/1988 | Madocks et al. | 251/193 |
| 5,002,255 | 3/1991 | Sawa et al. | 251/193 |
| 5,087,017 | 2/1992 | Sawa et al. | 251/175 |
| 5,116,023 | 5/1992 | Contin | 251/203 |
| 5,120,019 | 6/1992 | Davis, Jr. | 251/193 |
| 5,626,324 | 5/1997 | Nakamura et al. | 251/204 |

*Primary Examiner*—Kevin Shaver
*Assistant Examiner*—Eric Keasel
*Attorney, Agent, or Firm*—Sughrue, Mion, Zinn, Macpeak & Seas, PLLC

[57] ABSTRACT

A non-sliding vacuum gate valve according to the present invention has a curved cam lead member provided to end of a valve rod, and a pair of rollers provided to a connection rod. The cam lead member and the rollers are engaged with each other and move relatively, so that vertical movement and slant movement of a valve plate and the valve rod are guided.

12 Claims, 10 Drawing Sheets

OPENED VALVE

CLOSED VALVE

CLOSED
POSITION

ROTATION
FINISHED
CONDITION

DESCENDING
CONDITION

NON-SLIDING VACUUM GATE VALVE

BACKGROUND OF THE INVENTION

The present invention relates to a non-sliding vacuum gate valve, and more particularly to an improvement for reducing the number of components, and for attaining smooth action, simple structure and small size without using a spring member that forces a valve rod in a predetermined direction.

A structure of such a non-sliding vacuum gate valve used in the prior art is disclosed in Unexamined Japanese Patent Publication No. 7-83336, for example. The valve uses a set of inclined link and tension spring, a set of plate cam and tension spring, or a set of pin and cam hole, so as to prevent slant movement of a valve plate and a valve rod when they are moving, and so that the valve plate and the valve rod are slanted after they have reached a predetermined position to close the opening of a valve box by the valve plate.

However, a conventional non-sliding vacuum gate valve as mentioned above has following disadvantages. First, the conventional valve has a complicated structure since it requires a lot of components and a space for receiving the tension spring.

In addition, it is desirable for spring to be strong for secure action. In this case, reaction of the tension spring is strong, so that a high power cylinder is needed.

Furthermore, in order to activate a mechanical lock, the cam plate or link should be in the horizontal position. However, it is difficult to start the opening action from this position, resulting in little possibility of a mechanical lock being used.

SUMMARY OF THE INVENTION

It is an object of the preset invention to provide a non-sliding vacuum gate valve that does not have a spring member forcing a valve rod in a predetermined direction and can reduce the number of components.

A non-sliding vacuum gate valve according to the present invention comprises a valve box having an opening, a valve plate that opens and closes the opening, the valve plate being provided to a valve rod that is moved and inclined by cylinders and a seal bellows provided to the valve box, and a cam lead member and a pair of rollers provided between the valve rod and a connection rod of the cylinders. The cam lead member is disposed between the rollers, so that the movement of the cylinders is transmitted to the valve rod for the valve plate to open or to close the opening.

As a concrete embodiment, the cam lead member is provided to the end of the valve rod and the rollers are provided to the connection rod of the cylinders.

Alternatively, the cam lead member is provided to the connection rod of the cylinders and the rollers are provided to the end of the valve rod.

Preferably, the cam lead member has a curved longitudinal protruding portion.

More preferably, the cam lead member has cam lead surfaces consisting of an arc surface and a continuous combination curve surface of plural arcs surfaces, which is a trace of a contact point with the rollers.

In another embodiment, the non-sliding vacuum gate valve further comprises a valve rod support member connected to the seal bellows for moving together with the valve rod, longitudinal guide rails disposed at the inner side of the cylinders, rotation shafts provided to the end of the valve rod support member for engaging the longitudinal guide rails, narrow grooves provided to the longitudinal guide rails, so that outer surface and axial flat portions of the rotation shafts are engaged with the narrow grooves.

Preferably, the cam lead surface of the cam lead member is provided with a lock position for locking the rollers, at which the valve plate closes the opening.

More preferably, plural sets of the rollers are provided in the axial direction.

DETAILED DESCRIPTION OF THE PREFERRED EMBODIMENTS

Hereinafter, preferred embodiments of a non-sliding vacuum gate valve according to the present invention will be described with reference to the accompanying drawings.

Figure 1:
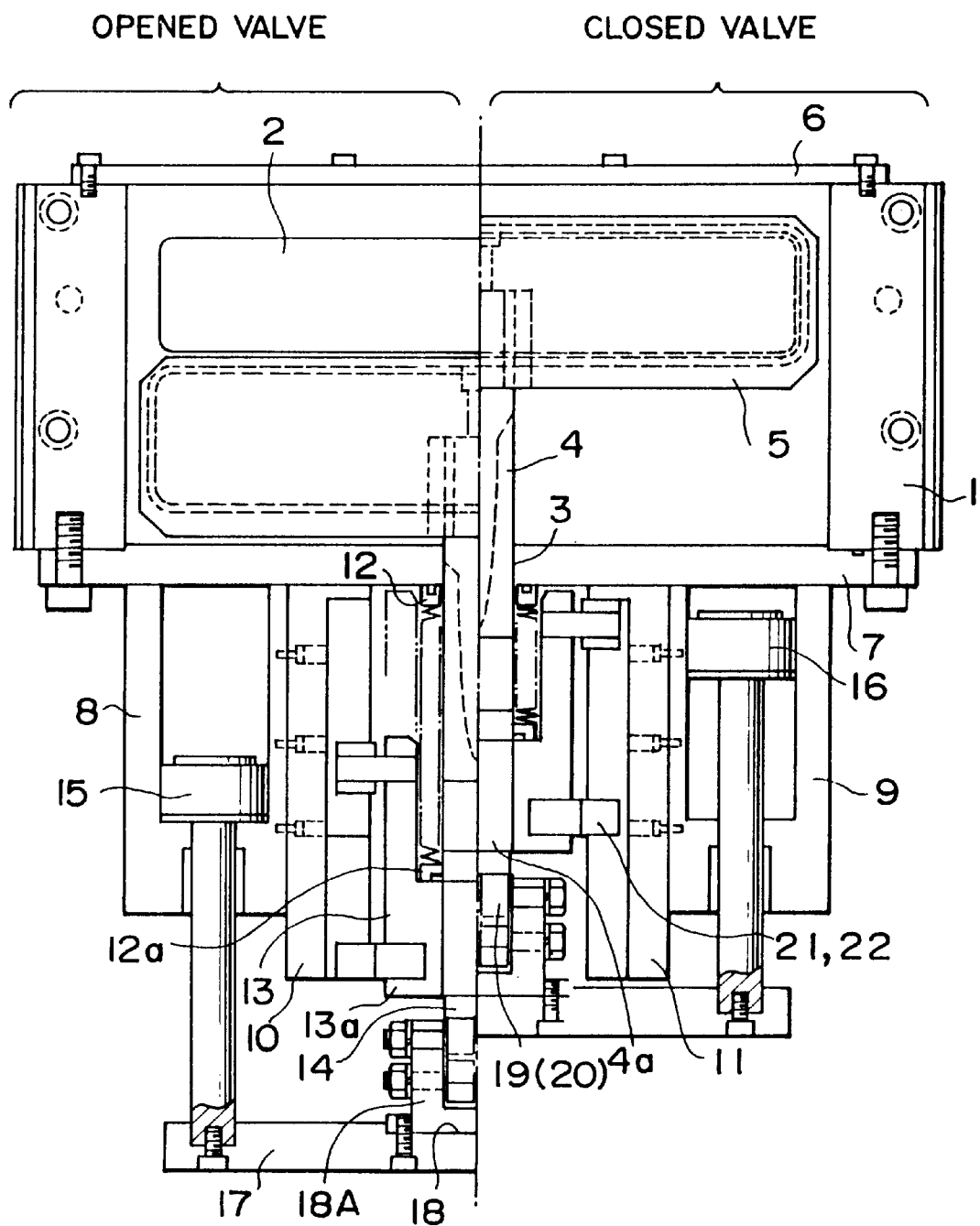
FIG. 1 is a schematic drawing of a non-sliding vacuum gate valve according to the present invention showing the opened valve state and the closed valve state from side to side.

FIG. 1 shows the valve in the opened state and the closed state from side to side. In FIG. 1, reference numeral 1 denotes a valve box having an opening 2 and a guide hole 3, through which a valve rod 4 penetrates. The valve rod 4 has a valve plate 5 that is disposed in the valve box 1.

The valve box 1 has an upper lid 6 and a lower lid 7 facing each other. The lower lid 7 is provided with a pair of air cylinders 8 and 9 having a pair of guide rails 10 and 11 at the inner sides thereof. Each of the guide rails 10 and 11 has a longitudinal groove at the inner side and along the longitudinal direction thereof. A narrow groove portion 50 and a wide groove portion 51 that is wider than the narrow groove portion 50 are formed continuously from the lower side to the upper side of the guide rails 10 and 11, and a step portion 52 is formed at the wall portion.

The guide hole 3 provided to the lower lid 7 of the valve box 1 has a seal bellows 12 that is disposed at periphery of the valve rod 4 and coaxially with the valve rod 4, and contacts closely with a portion of the guide hole 3. The lower end 12a of the seal bellows 12 is connected to a valve rod support member 13 having a U-shaped section, which is disposed at a periphery of the seal bellows 12.

Figure 2:
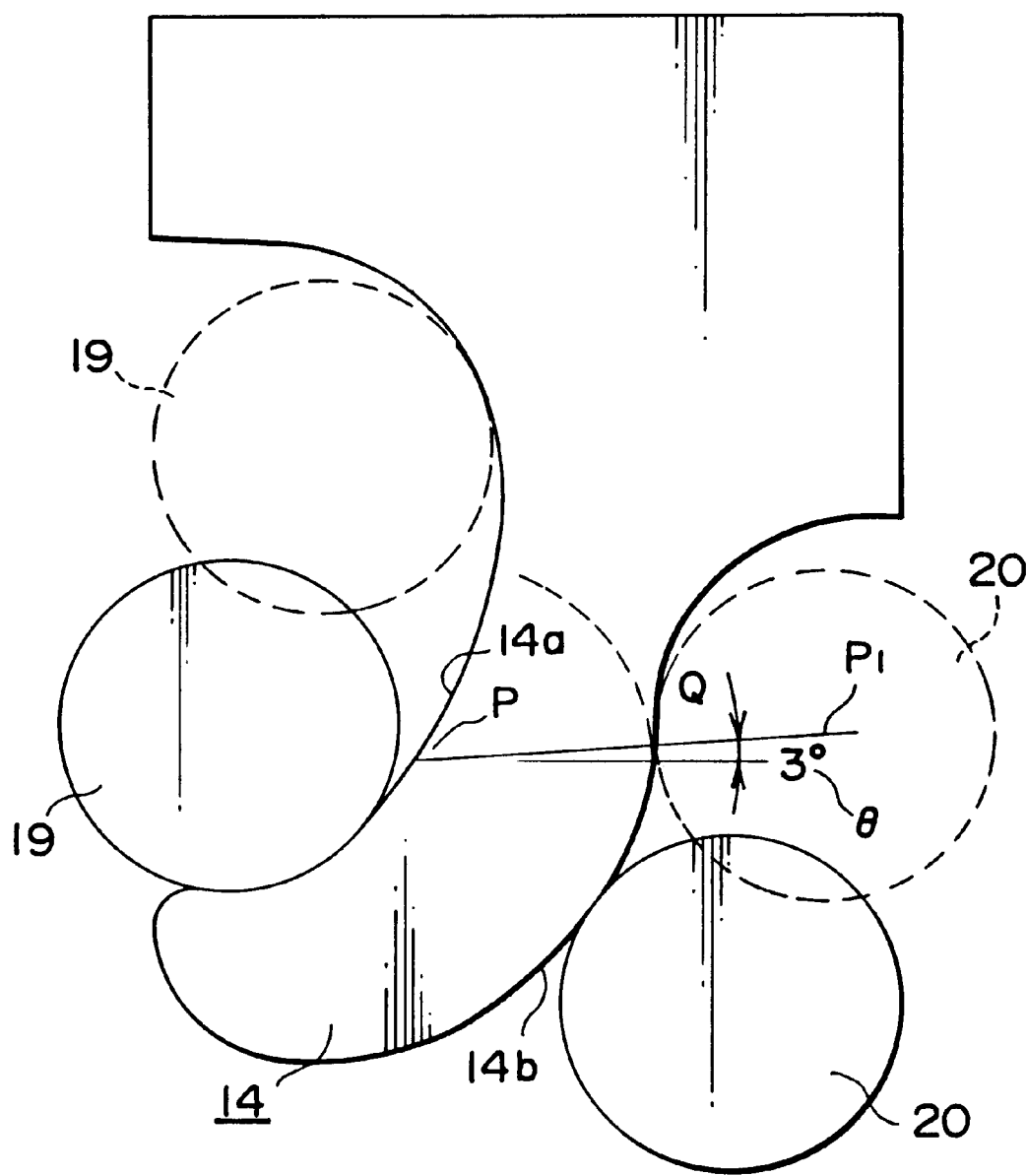
FIG. 2 is a schematic drawing of a principal part of the non-sliding vacuum gate valve shown in FIG. 1.
Figure 3:
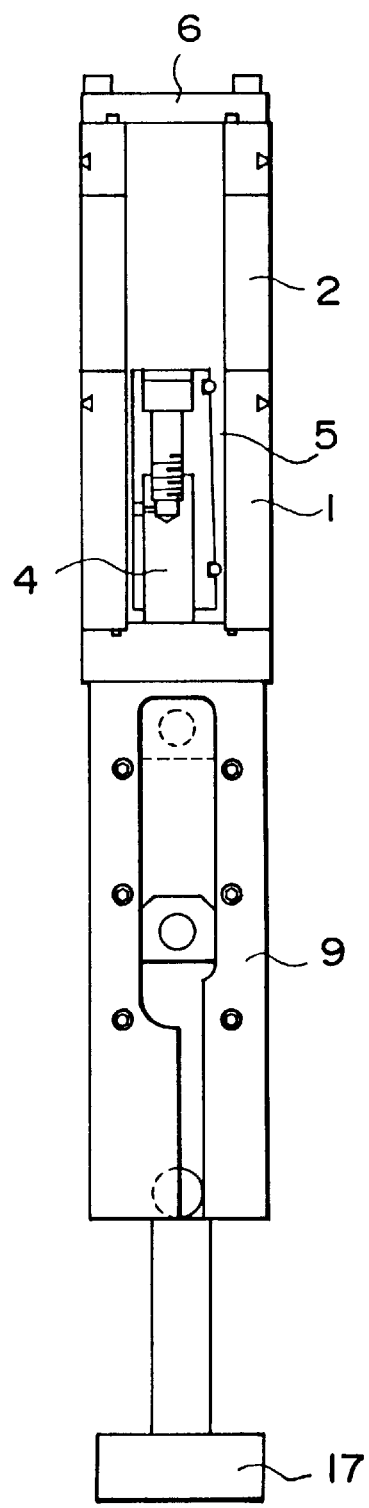
FIG. 3 is a side view of the non-sliding vacuum gate valve shown in FIG. 1 showing the opened valve state.

The bottom portion of the valve rod support member 13 is connected to the lower portion 4a of the valve rod 4, so that the guide hole 3 is sealed with the seal bellows 12. The valve rod 4 is connected to a cam lead member 14, which has an arc shape and a protruding longitudinal portion as shown in FIG. 2. A first cam lead surface 14a and a second cam lead surface 14b are formed on both sides of the protruding longitudinal portion. The first cam lead surface 14a is a continuous arc surface over the entire length, while the second cam lead surface 14b is a continuous combination curve surface of a convex surface and a concave surface. In the upper portion of the second cam lead surface 14b, there is point Q that is the lock position of a roller 20.

Cylinder pistons 15 and 16 of the cylinders 8 and 9 are connected with each other via a connection rod 17. The middle portion of the connection rod 17 is provided with a recess 18 corresponding to the cam lead member 14. A first roller 19 and a second roller 20, which are attached to the recess 18 via a roller support member 18A, make sliding contact with the cam lead surfaces 14a and 14b, respectively. The cam lead member 14 is disposed between the first and the second rollers 19 and 20. Two sets of the combination mechanism including the first and the second rollers 19 and 20 are provided in the axial direction.

Figure 9:
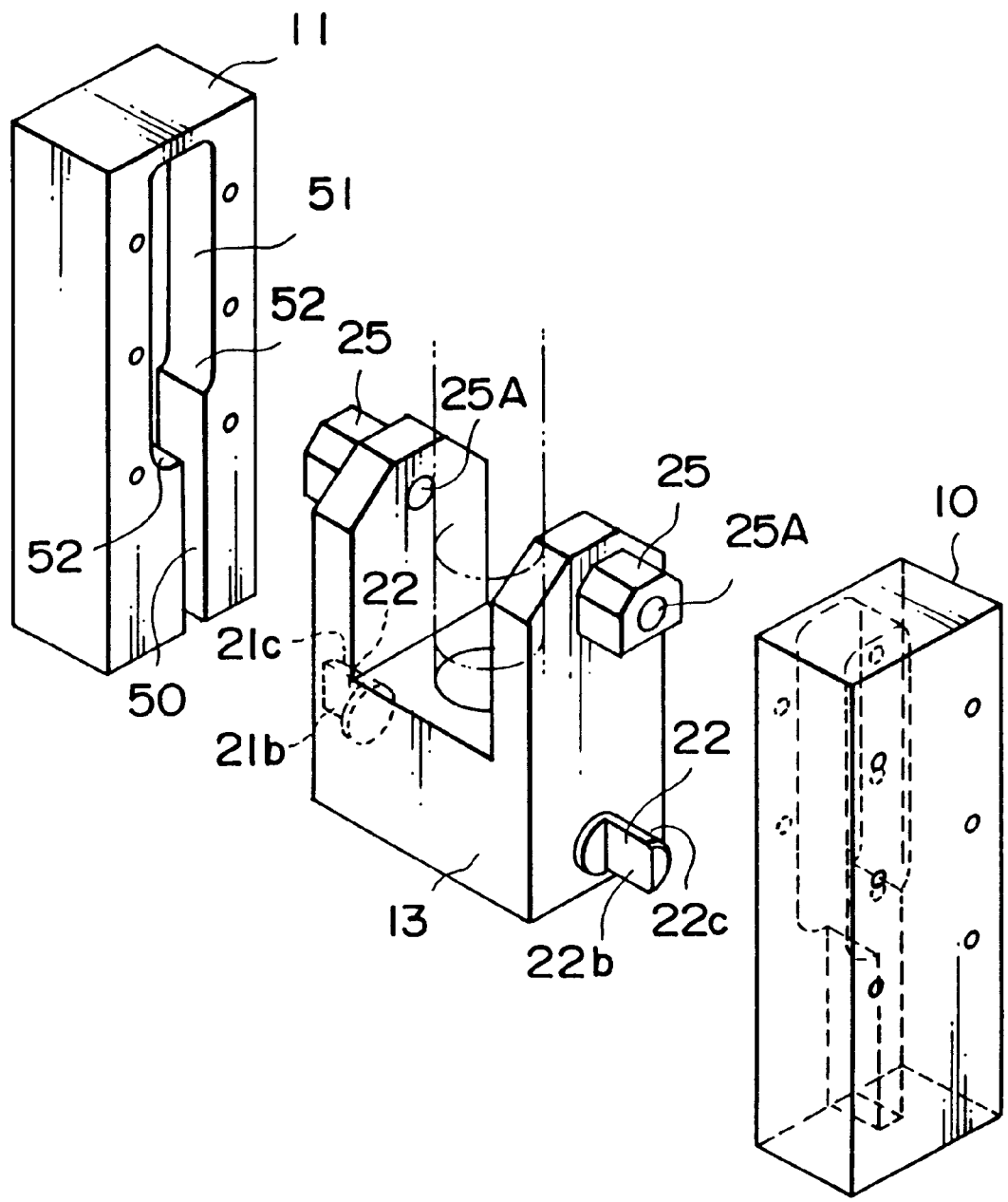
FIG. 9 is an exploded view of a principal part of the valve shown in FIG. 1.

As shown in FIGS. 1 and 9, a pair of rotation shafts 21 and 22 is provided to the upper portion of the valve rod support member 13, protruding horizontally in the outside direction. The rotation shafts 21 and 22 move inside and along the narrow groove portions 50 of the guide rails 10 and 11, while flat portions 21b and 22b formed on the rotation shafts 21 and 22 in the axial direction engage the narrow groove portions 50. Each of the rotation shafts 21 and 22 has a half circumference surface 21c and 22c.

The valve rod support member 13 has a pair of rectangular stoppers 25 pivoted by the shaft 25A at the upper portion of the both outer sides of the valve rod support member 13. Each of the stoppers 25 is disposed inside the corresponding wide groove 51.

Figure 10A:
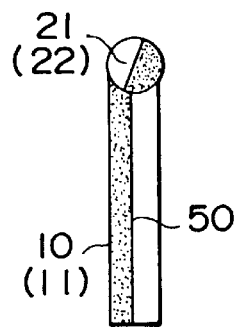
FIGS. 10A–10C illustrate action of the principal part of the valve shown in FIG. 1.
Figure 11A:
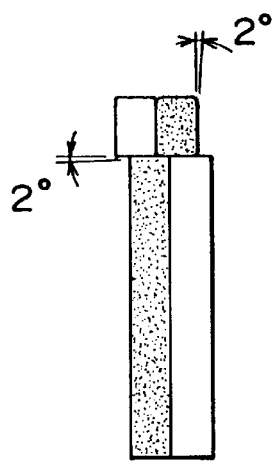
FIGS. 11A–11C illustrate action of the principal part of another valve as a variation of the valve shown in FIG. 1.
Figure 11B:
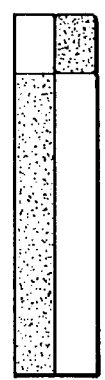
Figure 11C:
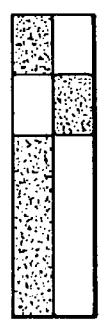

Each of the rotation shafts 21 and 22 can rotate as shown in FIG. 10A when the engagement with the narrow groove 50 is released. Though the rotation shafts 21 and 22 have semicircle sections mentioned above, it is possible that they have rectangular sections as shown in FIGS. 11A–11C to obtain the same effect.

Figure 8:
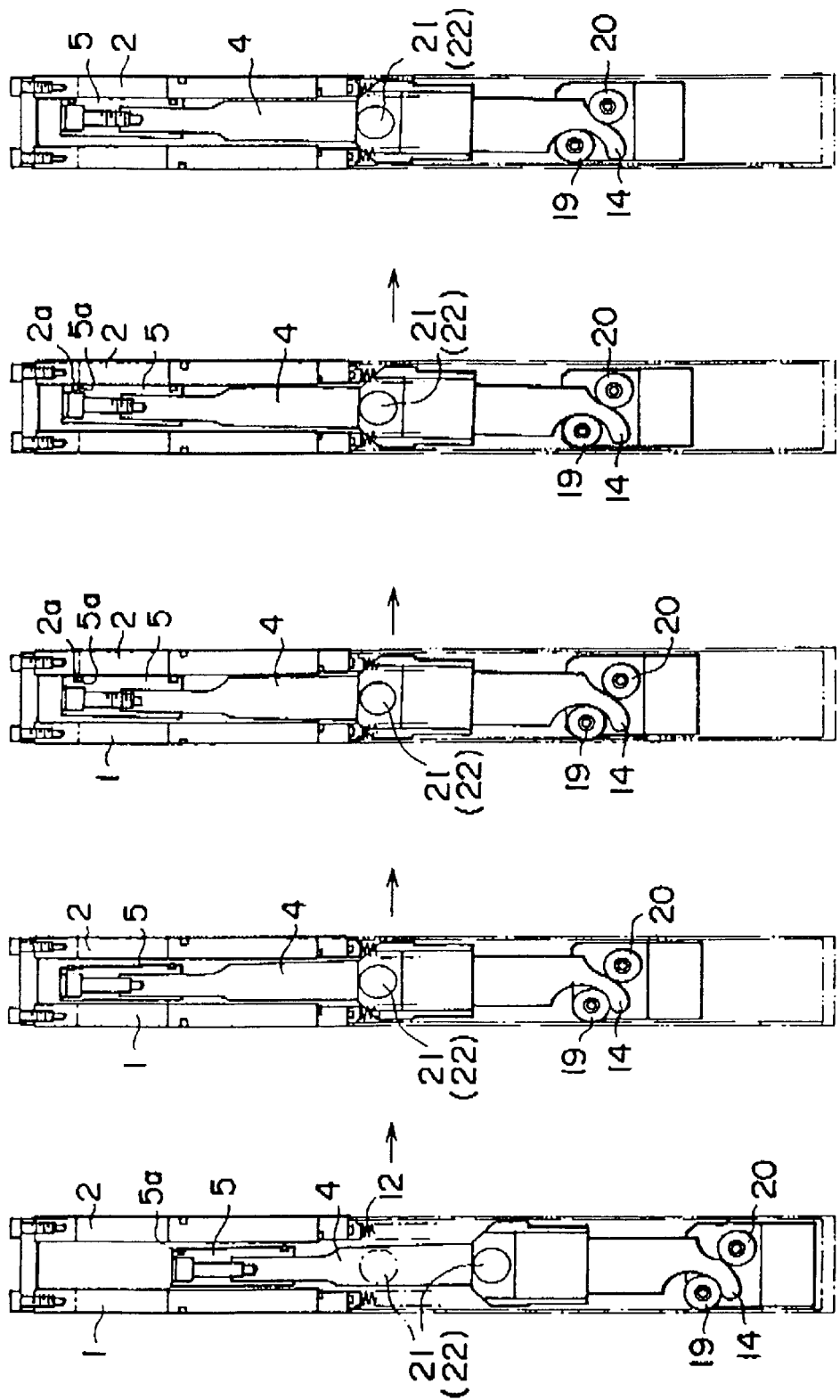
FIGS. 8A–8E illustrate action of the valve sequentially from the opened valve state to the closed valve state.

Next, the action of the valve will be explained with reference to FIGS. 3 to 8. First, in the state shown in FIGS. 8A and 3, the valve plate 5 is opened, and the valve shaft 4 is retained not to drop downward since the cam lead member 14 engages the rollers 19 and 20. As shown in FIGS. 8B and 5, when the cylinders 8 and 9 are activated to move the cylinder piston 15 and 16 as well as the connection rod 17 upward toward the closed valve state shown in FIG. 1, the valve plate 5 is moved upward to the position corresponding to the opening 2 of the valve box 1, and the rotation shafts 21 and 22 are moved upward along the guide rails 10 and 11. The relationship between the cam lead member 14 and the rollers 19 and 20 maintains substantially the same state as shown in FIG. 8A.

Next, as shown in FIG. 8C and 8D, when the connection rod 17 is moved upward by the cylinders 8 and 9, the rotation shafts 21 and 22 are released from the engagement with the narrow grooves 50 of the guide rails 10 and 11, and the rollers 19 and 20 move along the cam lead surfaces 14a and 14b of the cam lead member 14. Then, the rotation shafts 21 and 22 rotate from the state shown in FIG. 10B to the state shown in FIG. 10A, and the valve rod support member 13 and the valve rod 4, which are integral with the rotation shafts 21 and 22, rotate (i.e., slant) around the shaft 25A, so that an O-ring 5a of the valve plate 5 contact tightly with the valve seat 2a of the opening 2.

Figure 4:
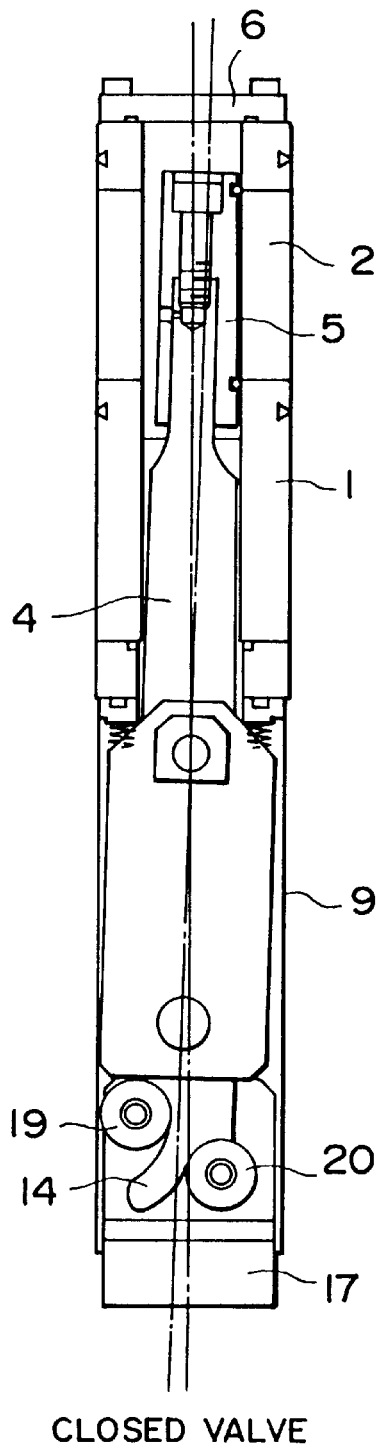
FIG. 4 is a side view of the non-sliding vacuum gate valve shown in FIG. 1 showing the closed valve state.
Figure 5:
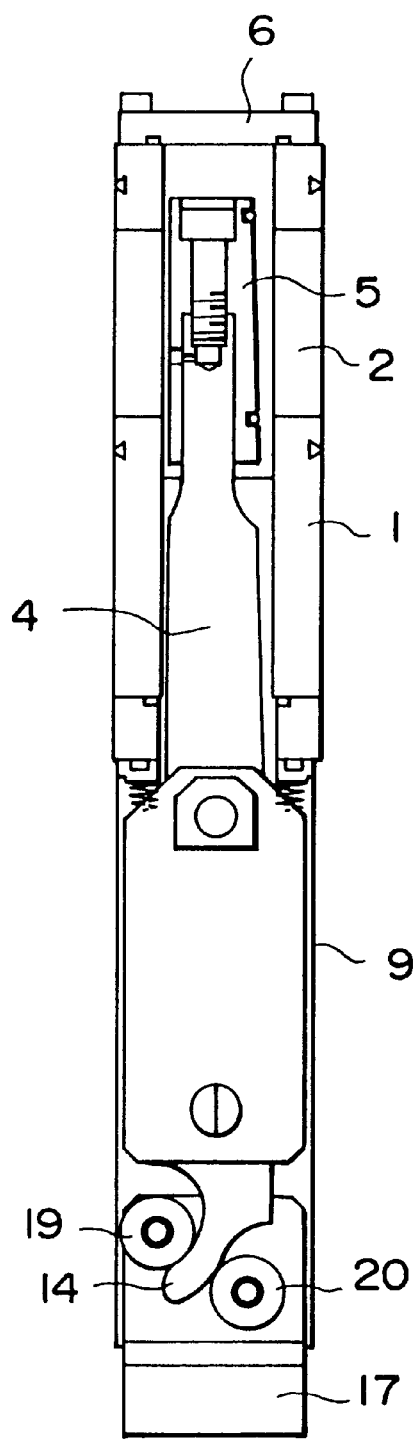
FIG. 5 is a side view of the non-sliding vacuum gate valve transferring from the opened valve state to the closed valve state.
Figure 6:
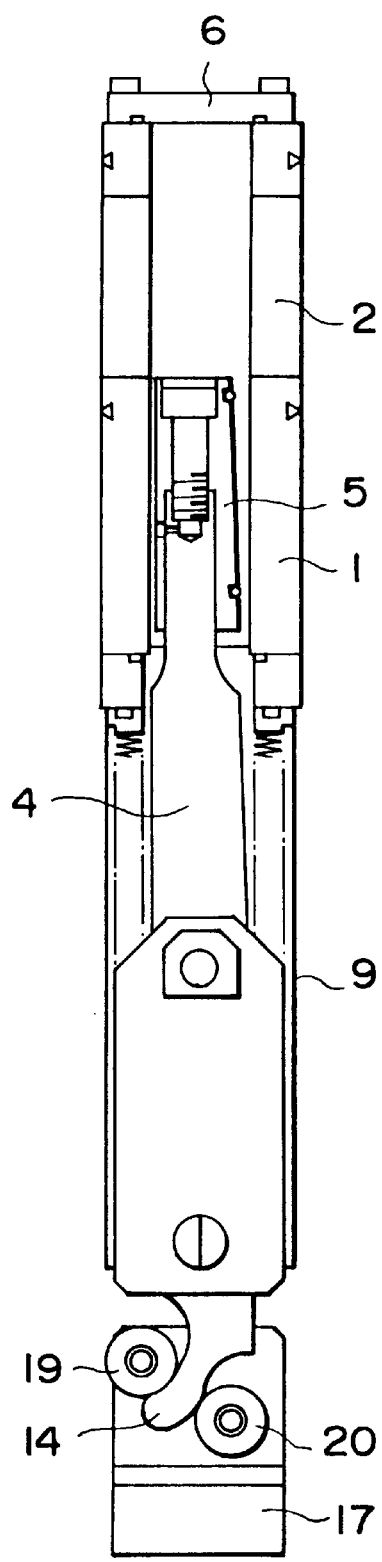
FIG. 6 illustrates a cam lead member of the opened valve shown in FIG. 3.
Figure 7:
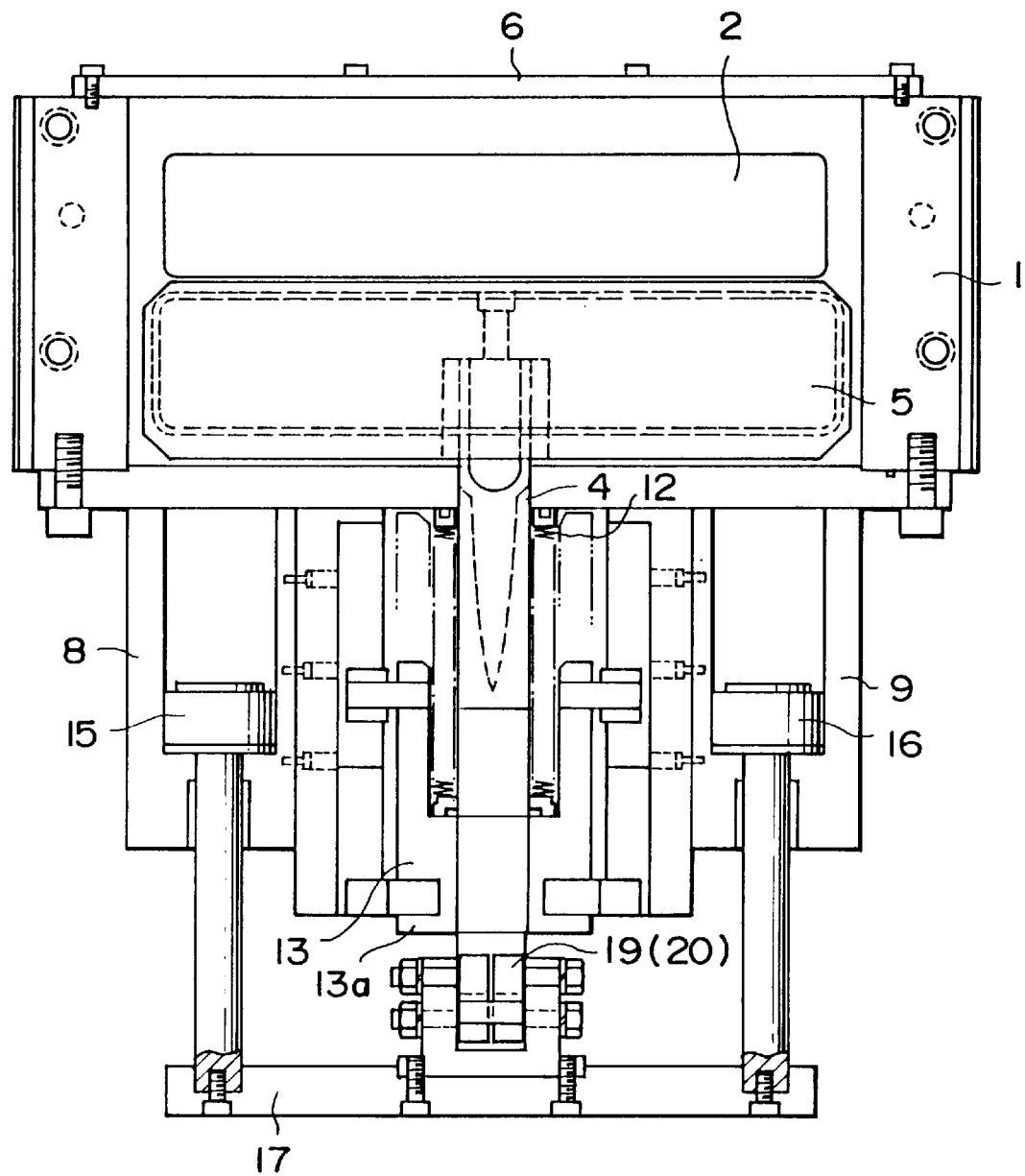
FIG. 7 is an overall schematic drawing of the opened valve shown in FIG. 1.

Next, when the cylinders 8 and 9 are activated to move the connection rod 17 upward, as shown in FIGS. 8E and 4, the rollers 19 and 20 are engaged securely with the point Q shown in FIG. 2 of the cam lead member 14 and is locked. In this state, the O-ring 5a of the valve plate 5 is deformed and is pressed to the valve seat 2a completely, so that the opening 2 is closed securely. In this condition, even if the activation of the cylinders 8 and 9 is stopped, the closed state of the valve plate 5 is not influenced since the rollers 19 and 20 maintain the secure locked state with lock positions B and C.

In the above-mentioned closed valve state shown in FIG. 8E, a shift angle θ of approximately three degrees is provided between the rotation center P of the second roller 20 of the first cam lead surface 14a and the axis P1 of the second roller 20 in the locked state. By this shift angle θ, the locked state is maintained securely.

Next, when opening the valve plate 5 from the above-mentioned closed state, the cylinders 8 and 9 are moved downward. Then, the connection rod 17 starts to move downward via the cylinder piston 15 and 16, and the engagement of the rollers 19 and 20 with the cam lead member 14 transfers from the state shown in FIG. 8E to the state shown in FIG. 8A contrary to the above-mentioned direction. Thus, the valve plate 5 opens completely separating from the valve seat 2a of the opening 2. Concerning the cam lead member 14 and the roller 19 and 20, the opposite arrangement is possible, in which the cam lead member 14 is attached to the connection rod 17, and the rollers 19 and 20 are attached to the valve rod support member 13.

Figure 10B:
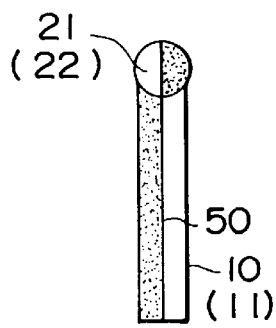
Figure 10C:
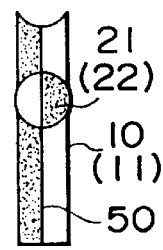

The slant returning action and the vertical moving action are preferably performed independently of each other in the valve opening action. Therefore, movement separation of the shafts 21 and 22 as shown in FIGS. 10A–10B is effective. This movement separation is necessary because if the two movements are performed simultaneously, the vertical movement start before the O-ring 5a separates from the seal surface. In this case, since the O-ring 5a has to rub the seal surface, an accurate non-sliding action cannot be realized, and particles can be generated.

The above-mentioned non-sliding vacuum gate valve according to the present invention has the following effects. The valve of the present invention does not use a spring that was necessary in the prior art for preventing slant movement of a valve plate and a valve rod during their movements. The valve of the present invention also does not use a pin and a cam hole that was necessary for slant movement in the prior art. The valve of the present invention uses a pair of rollers, cam lead members and guide rails to attain a very smooth continuous action, and has a more simple mechanism than in the prior art. Thus, cost reduction and down sizing of the valve can be performed.

What is claimed is:

1. A non-sliding vacuum gate valve, comprising:
   a valve box having an opening;
   a valve plate that opens and closes the opening, the valve plate being attached to a valve rod that is moved and inclined by cylinders and seal bellows connected to the valve box; and
   a cam lead member and a pair of rollers, situated between the valve rod and a connection rod of the cylinders, the cam lead member being disposed between rollers, where the rollers remain in contact with the cam lead member during the movement of the cylinders, so that the movement of the cylinders is transmitted to the valve rod for the valve plate to open or to close the opening.

2. The non-sliding vacuum gate valve according to claim 1, wherein the cam lead member is attached to the end of the valve rod and the rollers are attached to the connection rod of the cylinders.

3. The non-sliding vacuum gate valve according to claim 1, wherein the cam lead member is attached to the connection rod of the cylinders and the rollers are attached to the end of the valve rod.

4. The non-sliding vacuum gate valve according to claim 2, wherein the cam lead member has a curved longitudinal protruding portion.

5. The non-sliding vacuum gate valve according to claim 3, wherein the cam lead member has a curved longitudinal protruding portion.

6. The non-sliding vacuum gate valve according to claim 2, wherein the cam lead member has two cam lead surfaces consisting of a first surface with a continuous arc surface over the entire first surface and a second surface having a plurality of arcs surfaces, where each of the rollers makes contact with and traces one of the first and second surfaces.

7. The non-sliding vacuum gate valve according to claim 3, wherein the cam lead member has two cam lead surfaces consisting of a first surface with a continuous arc surface over the entire first surface and a second surface having a plurality of arcs surfaces, where each of the rollers make contact with and traces one of the first and second surfaces.

8. The non-sliding vacuum gate valve according to claim 4, wherein the cam lead member has two cam lead surfaces consisting of a first surface with a continuous arc surface over the entire first surface and a second surface having plurality of arcs surfaces, where each of the rollers makes contact with and traces one of the first and second surfaces.

9. The non-sliding vacuum gate valve according to claim 5, wherein the cam lead member has two cam lead surfaces consisting of a first surface with a continuous arc surface over the entire first surface and a second surface having a plurality of are arcs surfaces, where each of the rollers makes contact with and traces one of the first and second surfaces.

10. The non-sliding vacuum gate valve according to claim 1, further comprising a valve rod support member connected to the seal bellows for moving together with the valve rod, longitudinal guide rails disposed at the inner side of the cylinders, rotation shafts provided to the end of the valve rod support member for engaging the longitudinal guide rails, the rails having narrow grooves so that outer surface and axial flat portions of the rotation shafts are engaged with the narrow grooves.

11. The non-sliding vacuum gate valve according to claim 1, wherein the cam lead surface of the cam lead member a lock position for locking the rollers, at which the valve plate closes the opening.

12. The non-sliding vacuum gate valve according to claim 11, wherein plural sets of the rollers are in an axial direction.

* * * * *